(12) United States Patent
Chen et al.

(10) Patent No.: US 6,421,663 B1
(45) Date of Patent: Jul. 16, 2002

(54) OPTIMIZATION OF JOINED TABLE EXPRESSIONS BY EXTENDED ACCESS PATH SELECTION

(75) Inventors: Yao-Ching Stephen Chen, Saratoga; Fen-Ling Lin, San Jose; Jerry Mukai, San Jose; Hong Tie, San Jose; Yun Wang, Saratoga, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/332,600

(22) Filed: Jun. 14, 1999

(51) Int. Cl.⁷ .............................................. G06F 17/30
(52) U.S. Cl. .................... 707/3; 707/2; 707/4; 707/5
(58) Field of Search ............................... 707/2, 3, 4, 5

(56) References Cited

U.S. PATENT DOCUMENTS

| | | | |
|---|---|---|---|
| 5,241,648 A | | 8/1993 | Cheng et al. .................. 707/7 |
| 5,301,317 A | * | 4/1994 | Lohman et al. ................. 707/1 |
| 5,617,567 A | | 4/1997 | Doktor .......................... 707/2 |
| 5,742,806 A | | 4/1998 | Reiner et al. ................... 707/3 |
| 5,802,357 A | | 9/1998 | Li et al. ......................... 707/2 |
| 5,826,261 A | * | 10/1998 | Spencer ......................... 707/5 |
| 5,930,785 A | * | 7/1999 | Lohman et al. ................. 707/2 |
| 6,275,818 B1 | * | 8/2001 | Subramanian et al. .......... 707/2 |

OTHER PUBLICATIONS

Hamid Pirahesh et al., "Extensible/Rule Based Query Rewrite Opitimization in Starburst", Proceedings of ACM SIGMOD '92 International Conference on Management of Data, Sand Diego, CA, 1992, pp. 39–48.

Software Patent Institute Database of Software Technologies Record Display, IBM Corporation ©1995, 1996, Serial No.: TDB0288.0025, "Access Path Selection in Relational Database Systems", pp. 420–421 (2pp).

* cited by examiner

*Primary Examiner*—Diane D. Mizrahi
(74) *Attorney, Agent, or Firm*—Gates & Cooper LLP

(57) ABSTRACT

A method, apparatus, and article of manufacture for analyzing a query and extending an access path selection for the query, in order to optimize joined table expressions and complex join operations in the query. The extension of the access path selection occurs in two phases: (1) an access path selection router analyzes and divides the query into portions, so that the overall access path selection is divided into smaller access path selections for processing by a join enumerator; and (2) the join enumerator is provided to handle joined table expressions and complex join operators, wherein the join enumerator can be continuously enhanced as more powerful query optimization techniques become available.

15 Claims, 8 Drawing Sheets

OPTIMIZATION OF JOINED TABLE EXPRESSIONS BY EXTENDED ACCESS PATH SELECTION

BACKGROUND OF THE INVENTION

1. Field of the Invention

This invention relates in general to database management systems performed by computers, and in particular, to the optimization of joined table expressions during query processing in database management systems by extended access path selection.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Institute (ANSI) and the International Standards Organization (ISO).

There are a number of well-known and widely-applied optimization methods for queries available in the prior art. Some examples of these optimization methods include Dynamic Programming, Greedy Algorithm, etc. Generally, these optimization methods attempt to find the best execution strategy for a query based on a cost estimation over a range of possible execution strategies in the search space.

Many SQL query compilation and optimization techniques use a parse tree or other representation. A query can be represented as a binary operator tree with operators as the intermediate tree nodes and table references as leaf tree nodes. A straightforward query execution plan is to perform the operators one by one from the bottom up of the tree. This is termed an access path selection.

While optimization via access path selection is well known, it has not been successfully applied to joined table expressions. Joined table expressions are found in FROM clauses of SELECT statements, and generally take the form of "table-reference join-operator table-reference ON join-condition." The join-operator can be INNER JOIN, LEFT OUTER JOIN, RIGHT OUTER JOIN or FULL OUTER JOIN, the table-reference represents a base table or intermediate result table, and the join-condition is a boolean expression that results in a true, false, or unknown value. More complex joined table expressions can be a sequence of simple joined table expressions combined by join operators, parentheses, and nested table expressions.

There is a need in the art for improved methods of optimizing joined table expressions and complex join operations. Specifically, there is a need in the art for improved methods of optimizing joined table expressions and complex join operations using access path selection.

SUMMARY OF THE INVENTION

To overcome the limitations in the prior art described above, and to overcome other limitations that will become apparent upon reading and understanding the present specification, the present invention discloses a method, apparatus, and article of manufacture for analyzing a query and extending an access path selection for the query, in order to optimize joined table expressions and complex join operations in the query. The extension of the access path selection occurs in two phases: (1) an access path selection router analyzes and divides the query into portions, so that the overall access path selection is divided into smaller access path selections for processing by a join enumerator; and (2) the join enumerator is provided to handle joined table expressions and complex join operators, wherein the join enumerator can be continuously enhanced as more powerful query optimization techniques become available.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

OVERVIEW

A query optimization method extends access path selection so that it can optimize queries over joined table expressions and other complex join objects. A two phase method is used to extend the access path selection. An access path selection router is used to analyze and divide the query so that access path selection for each of the separate portions of the query can be optimized individually by an extensible join enumerator. The join enumerator is used to handle joined table expressions and complex join operators within each of the separate portions of the query.

HARDWARE ENVIRONMENT

Figure 1:
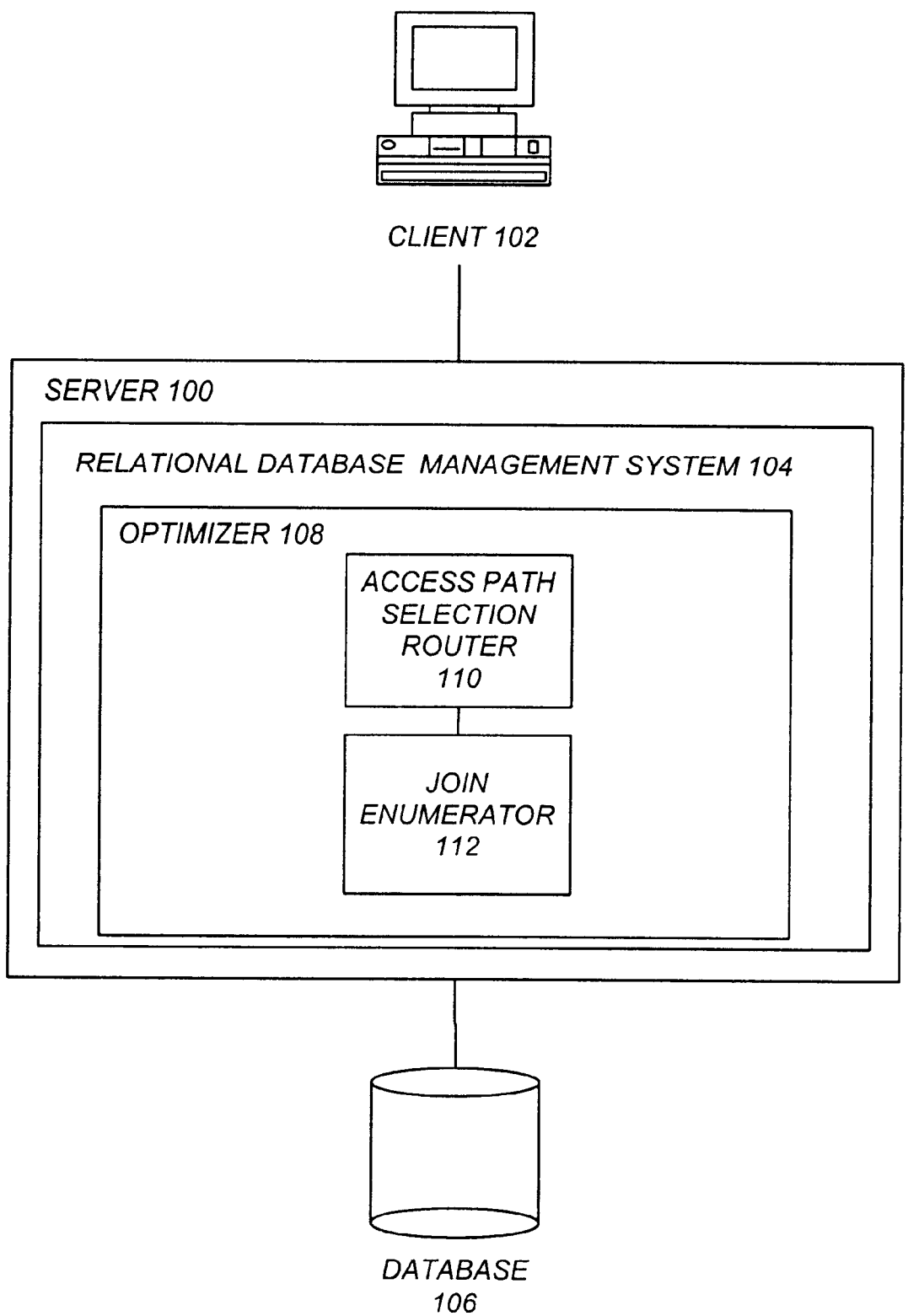
FIG. 1 illustrates an exemplary computer hardware environment that could be used with the preferred embodiment of the present invention.

FIG. 1 is a block diagram illustrating an exemplary hardware environment used to implement the preferred embodiment of the invention. In the exemplary hardware environment, a client/server architecture is illustrated comprising a server computer 100 coupled to a client computer 102. Both the server computer 100 and client computer 102 may include, inter alia, processors, random access memory (RAM), read-only memory (ROM), keyboard, display, fixed and/or removable data storage devices, and data communications devices. Those skilled in the art will recognize that any combination of the above components, or any number of different components, peripherals, and other devices, may be used with the server computer 102 and client computers 102. Those skilled in the art will also recognize that a single computer could be used, rather than multiple computers networked together.

The present invention is typically implemented in a Relational Database Management System (RDBMS) 104, such as the DB2 product sold by IBM Corporation, that manages a relational database 106, although it may be implemented with any database management system. In the example illustrated herein, the RDBMS 104 includes an optimizer 108, which itself includes an access path selection router 110 and a join enumerator 112.

The user at the client computer 102 generates commands for performing various search and retrieval functions, termed queries, against the database 106 managed by the RDBMS 104, which may invoke functions of the optimizer 108, access path selection router 110, and/or join enumerator 112. In the preferred embodiment, these queries conform to the Structured Query Language (SQL) standard, although other types of queries could also be used without departing from the scope of the invention. The queries invoke functions such as definition, access control, interpretation, compilation, data retrieval, and update of user and system data.

Generally, the RDBMS 104, the SQL queries, and the components thereof, are embodied in or retrievable from a device, medium, or carrier, e.g., a memory, a data storage device, a remote device coupled to the server computer 102 by a data communications device, etc. Moreover, these instructions and/or data, when read, executed, and/or interpreted by a computer system, cause the server computer 102 to perform the steps necessary to implement and/or use the present invention.

Thus, the present invention may be implemented as a method, system, or article of manufacture using standard programming and/or engineering techniques to produce software, firmware, hardware, or any combination thereof. The term "article of manufacture" as used herein is intended to encompass instructions and/or logic and/or data embodied in or accessible from any device, carrier, or media.

Of course, those skilled in the art will recognize many modifications may be made to this configuration without departing from the scope of the present invention. In addition, those skilled in the art will recognize that any combination of the above components, or any number of different components, including computer programs, peripherals, and other devices, may be used to implement the present invention, so long as similar functions are performed thereby.

INTERACTIVE SQL EXECUTION

Figure 2:
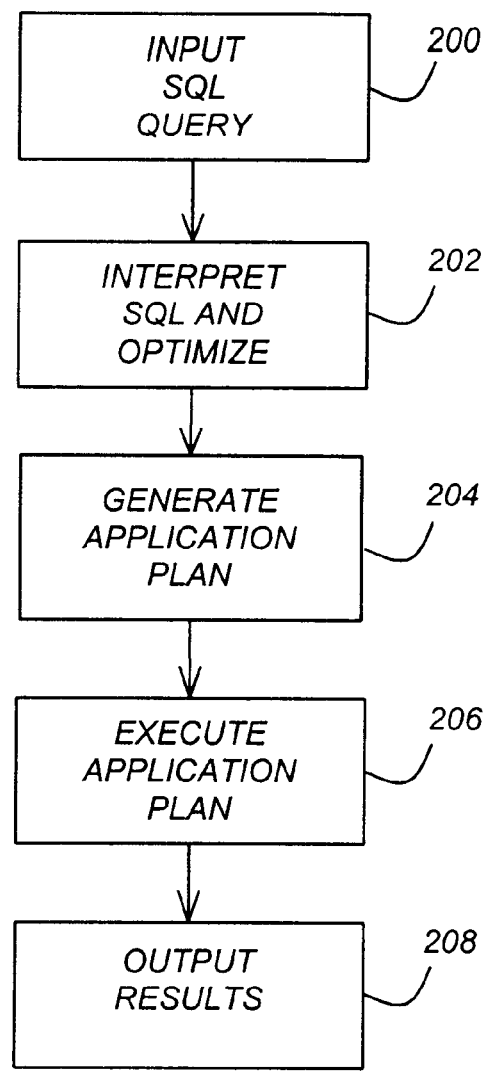
FIG. 2 is a flowchart illustrating the steps necessary for the interpretation and execution of SQL statements in an interactive environment according to the preferred embodiment of the present invention.

FIG. 2 is a flowchart illustrating the steps necessary for the interpretation and execution of SQL statements in an interactive environment according to the preferred embodiment of the present invention. Block 202 represents the input of SQL statements into the server computer 100. Block 204 represents the step of compiling or interpreting the SQL statements. Block 206 represents the step of optimizing and generating a compiled set of runtime structures called an application plan from the compiled SQL statements. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. At Block 206, the optimizer 108 may transform or optimize the SQL query in a manner described in more detail later in this specification. Block 208 represents the execution of the application plan, and block 210 represents the output of the results.

EMBEDDED/BATCH SQL EXECUTION

Figure 3:
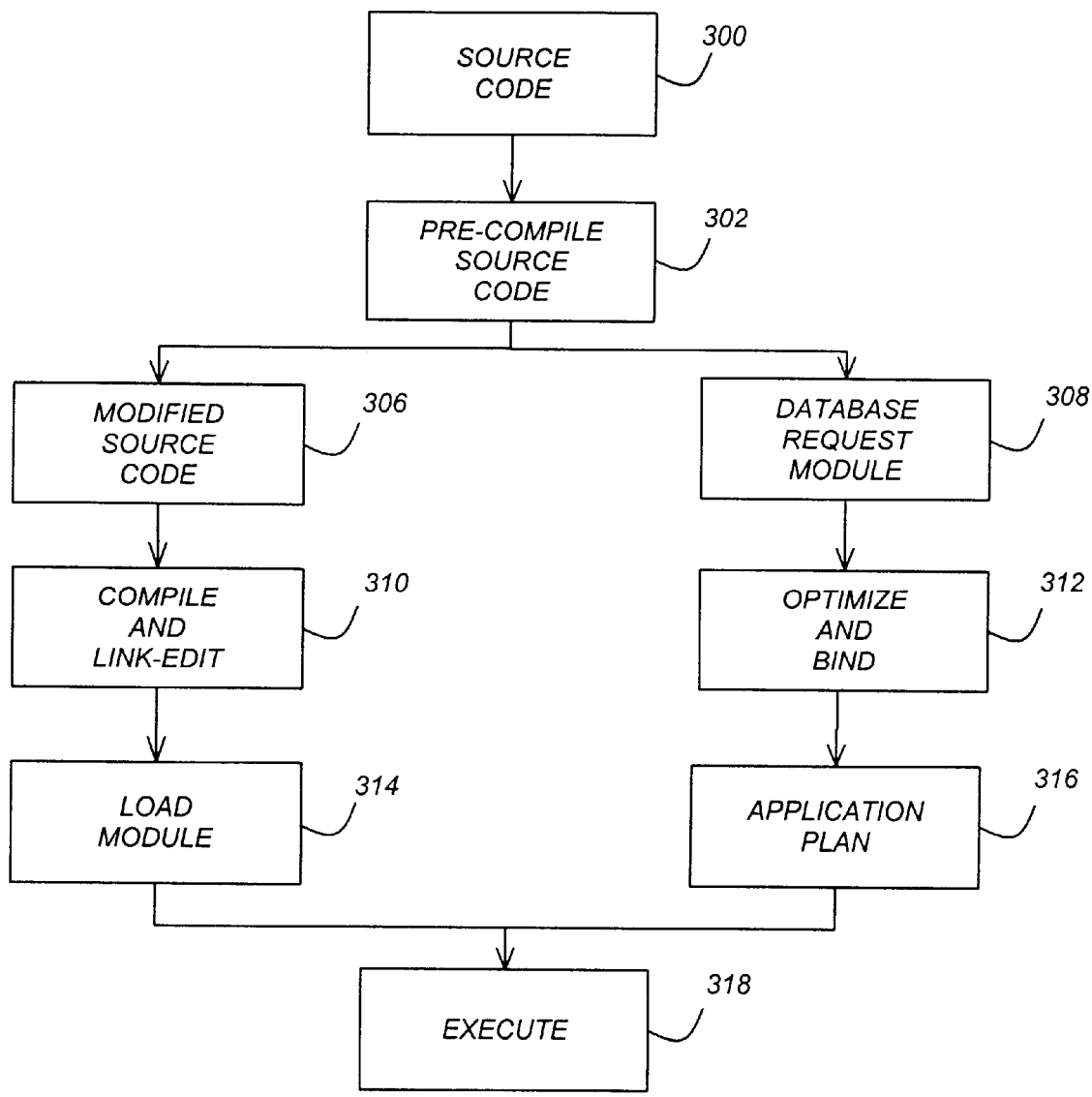
FIG. 3 is a flowchart illustrating the steps necessary for the interpretation and execution of SQL statements embedded in source code according to the preferred embodiment of the present invention.

FIG. 3 is a flowchart illustrating the steps necessary for the interpretation and execution of SQL statements embedded in source code according to the preferred embodiment of the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to the RDBMS 104, which the pre-compile step 304 inserts in place of SQL statements. The DBRM 308 is comprised of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the desired data, but not how to retreve the data. The optimize and bind step 314 may reorder or optimize the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

DESCRIPTION OF THE OPTIMIZATION TECHNIQUE

The present invention discloses an improved optimization technique that is typically performed at step 204 of FIG. 2 or step 314 of FIG. 3. Specifically, the present invention discloses an improved SQL query compilation and optimization technique.

The preferred embodiment of the present invention analyzes a query and extends the access path selection for the query, in order to optimize joined table expressions and complex join operations in the query. The preferred embodiment of the present invention comprises a two phase method for extending the access path selection:

the access path selection router 110 analyzes and divides the query into portions, so that the overall access path selection is divided into smaller access path selections for processing by the join enumerator 110, and the join enumerator 112 is provided to handle joined table expressions and complex join operators, wherein the join enumerator 112 can be continuously enhanced as more powerful query optimization techniques become available.

In the preferred embodiment, the access path selection router 110:

understands what optimization functions can be performed by the join enumerator 112, and divides the joined table expressions and complex join operators of the query into portions and prepares the portions query for processing by the join enumerator 112.

In the preferred embodiment, the join enumerator 112:

introduces a partial ordering relationship among the tables to model left/right outer join order preference, and introduces a cluster relationship among table references. In addition, the join enumerator 112 can be continuously enhanced as newer optimization techniques become available.

Consider the following example of a simple joined table expression including two left outer joins:

SELECT *
FROM DEPT LEFT JOIN EMP
  ON DEPT.DNO=EMP.DNO
  LEFT JOIN DIV
  ON DEPT.DID=DIV.DID;

Before joined table expressions were introduced into SQL, most conventional access path selection methods treated the tables in the FROM clause as having no dependencies therebetween. However, the outer join operators in joined table expressions are different from conventional join operators and usually need the tables in a certain order or clustered together to ensure that the joined table expressions are performed correctly and efficiently.

A straightforward query execution strategy is to follow the order of the joined table expressions in the parse tree. In the above example, DEPT is outer joined with EMP on DNO first, and the result saved in a work file. Then, the work file is outer joined with DIV on DID to obtain the final result.

The preferred embodiment of the present invention, in contrast, allows the access path selection to be optimized in order to find the best execution strategy for the query, instead of just following the order of the joined table expressions. Thus, in the preferred embodiment of the present invention, the optimizer 108 will not force materialization for each outer join operator, and the access path selection performed by the optimizer 108 will consider different, valid join permutations for the query, such as DEPT–>EMP–>DIV or DEPT–>DIV–>EMP in the above example, in order to determine the best join methods.

The overall problem is more complicated than the above example above, however, since the query can include both joined table expressions and complex join operations.

Consider the following example:

SELECT *
FROM DEPT LEFT JOIN EMP
  ON DEPT.DNO=EMP.DNO
  LEFT JOIN PROJ
  ON DEPT.DNO=PROJ.DNO
  AND
  EMP.ENO=PROJ.ENO,
  PROD
WHERE PROD.PNO=DEPT.NO;

The joined table expression includes two left joins among tables of DEPT, EMP, and PROJ. The results of this joined table expression are then joined with the PROD table in the FROM clause.

In the preferred embodiment, the query can include multiple joined table expressions and multiple join operations. In even more complicated examples, each table reference can be a complicated, nested table expression. The preferred embodiment of the present invention extends the access path selection method, so that it can optimize the query over a mixture of joined table expressions and database tables in the FROM clause.

As noted above, the preferred embodiment of the present invention includes a two phase methodology that extends the access path selection method. The access path selection router 110 analyzes and divides the overall access path selection into smaller ones to be handled separately by the join enumerator 112. The join enumerator 112 handles more complex and mixed join operators, and can be continuously enhanced as more powerful query optimization techniques become available.

Figure 4:
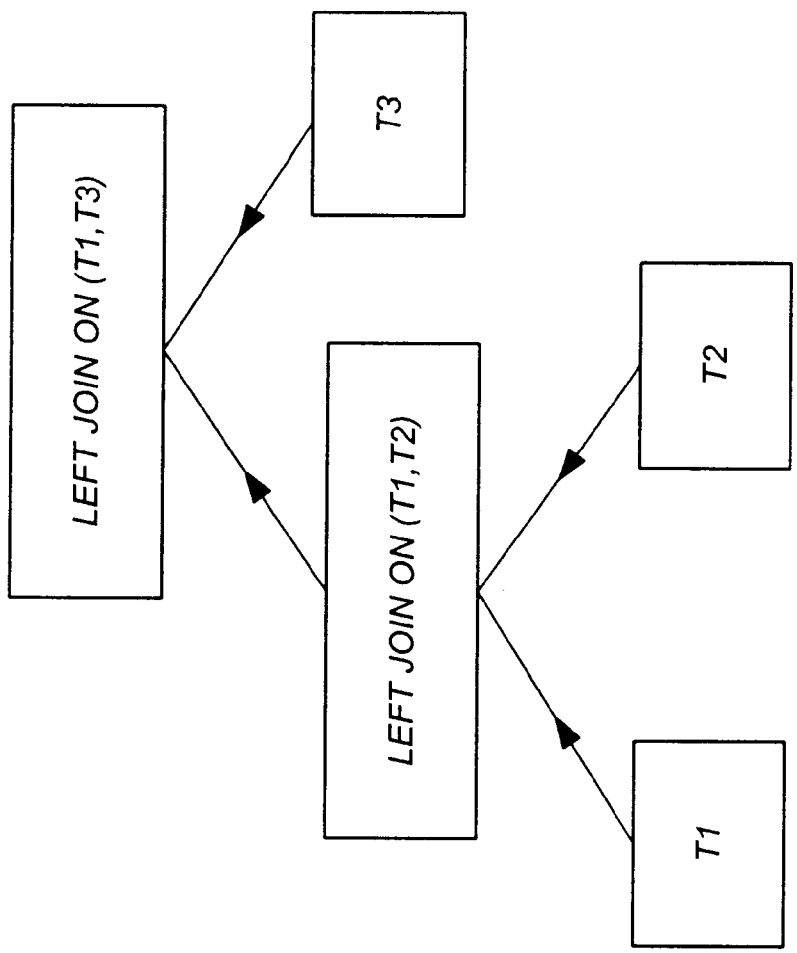
FIGS. 4–7 are parse tree representations of various queries used to illustrate the preferred embodiment of the present invention.

Currently, the join enumerator 112 introduces a partial ordering relationship among the tables to model left/right outer join order preference. Consider the example of FIG. 4. The partial ordering relationship among the tables indicates that a valid join sequence comprises: T1 precedes T2 and T1 precedes T3.

Figure 5:
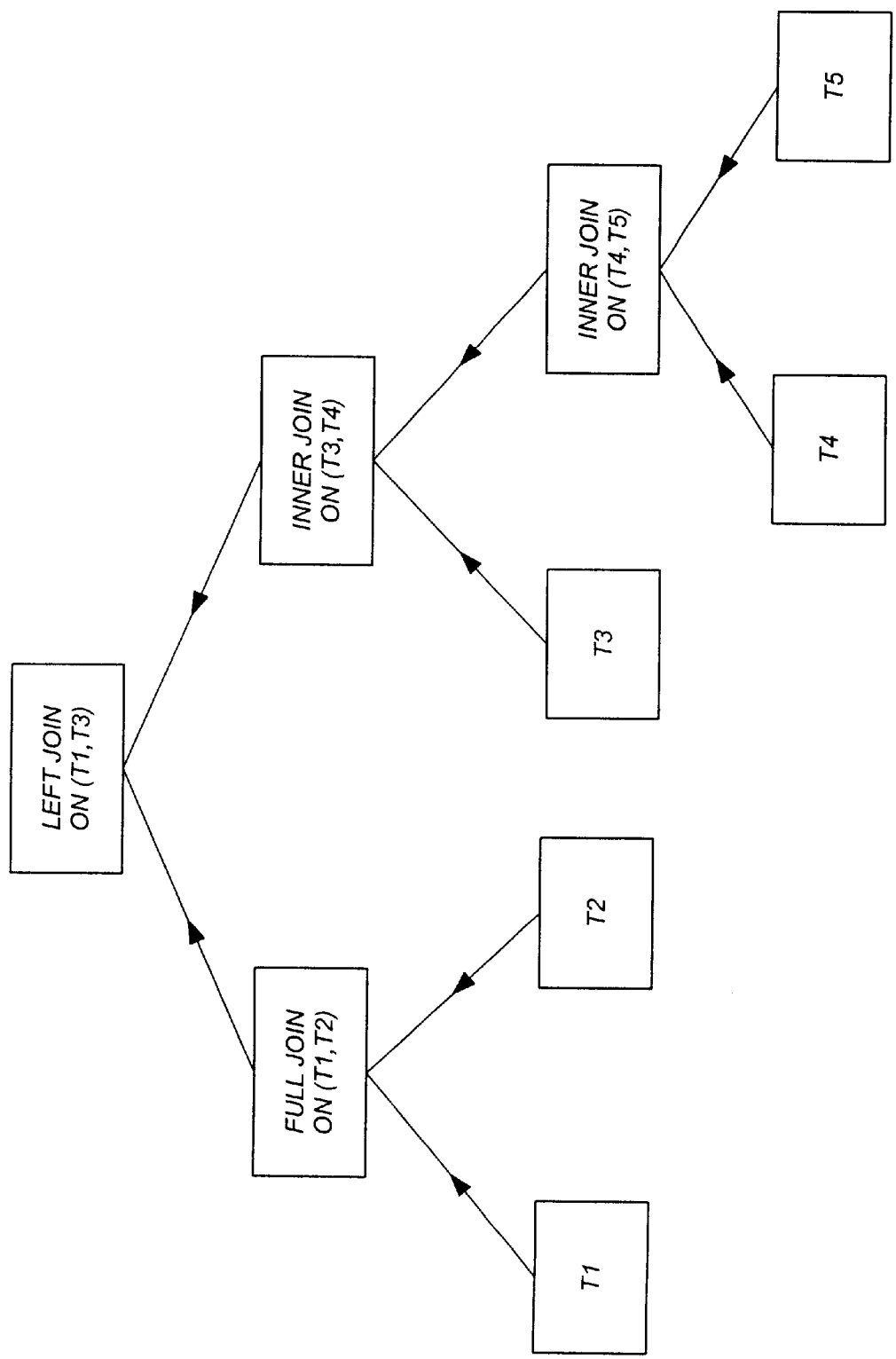

The join enumerator 112 also introduces a cluster relationship among the tables. Consider the example of FIG. 5. The cluster relationships (T1, T2) or (T3,T4,T5) can be used to model the full outer join or nested inner join needed for query execution. FIG. D indicates that the clusters (T1, T2) or (T3,T4,T5) should be joined together.

Figure 6:
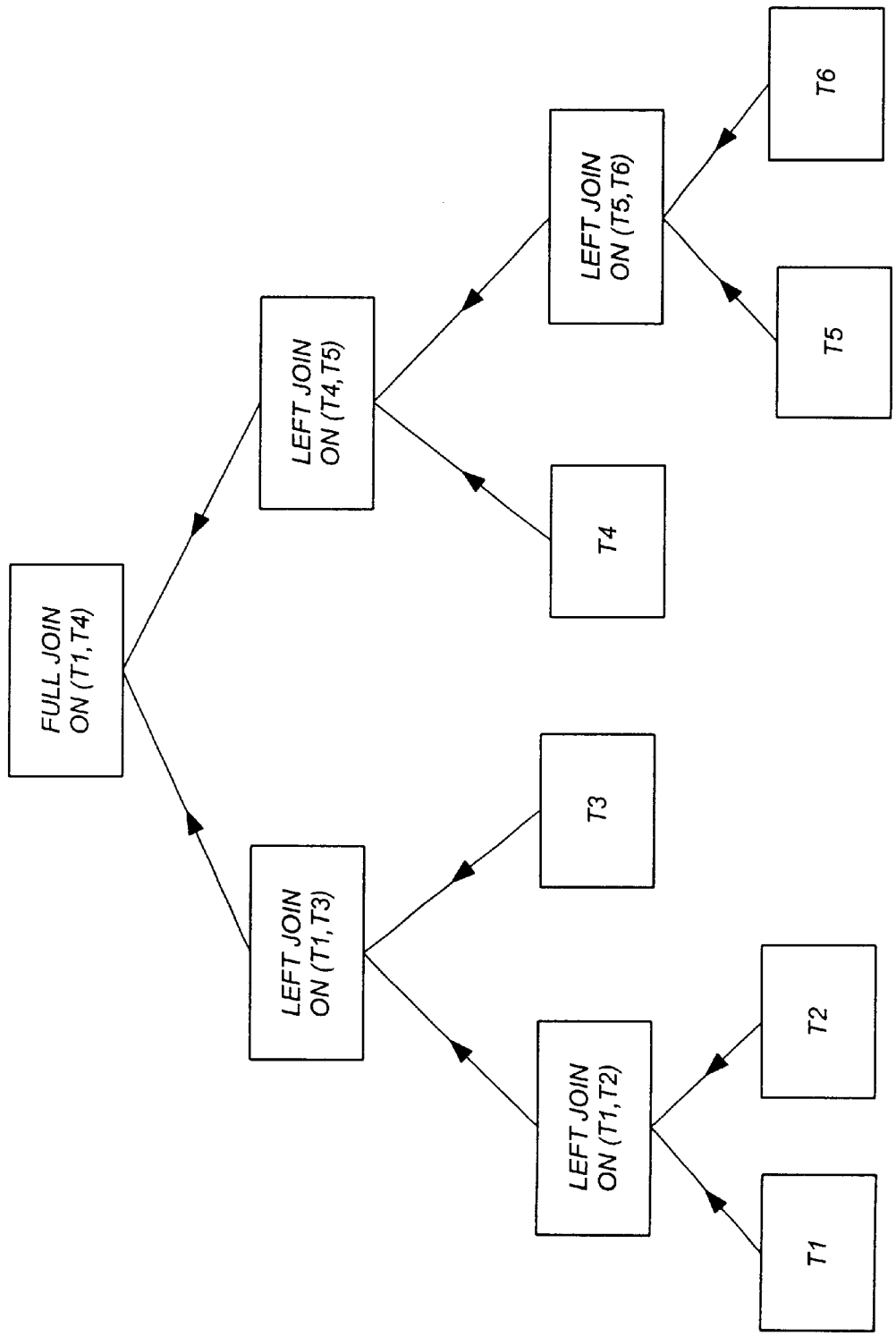

The access path selection router 110 knows the capabilities of the join enumerator 112 and divides the queries accordingly. For example, if the join enumerator 112 does not permutate the join sequence between full outer join and left outer joins in the example of FIG. 6, then the access path selection router 110 will send each left outer join subexpression LEFT-JOIN(LEFT-JOIN(T1,T2),T3) and LEFT-JOIN(T4, LEFT-JOIN(T5,T6)) separately to the enumerator 112.

Figure 7:
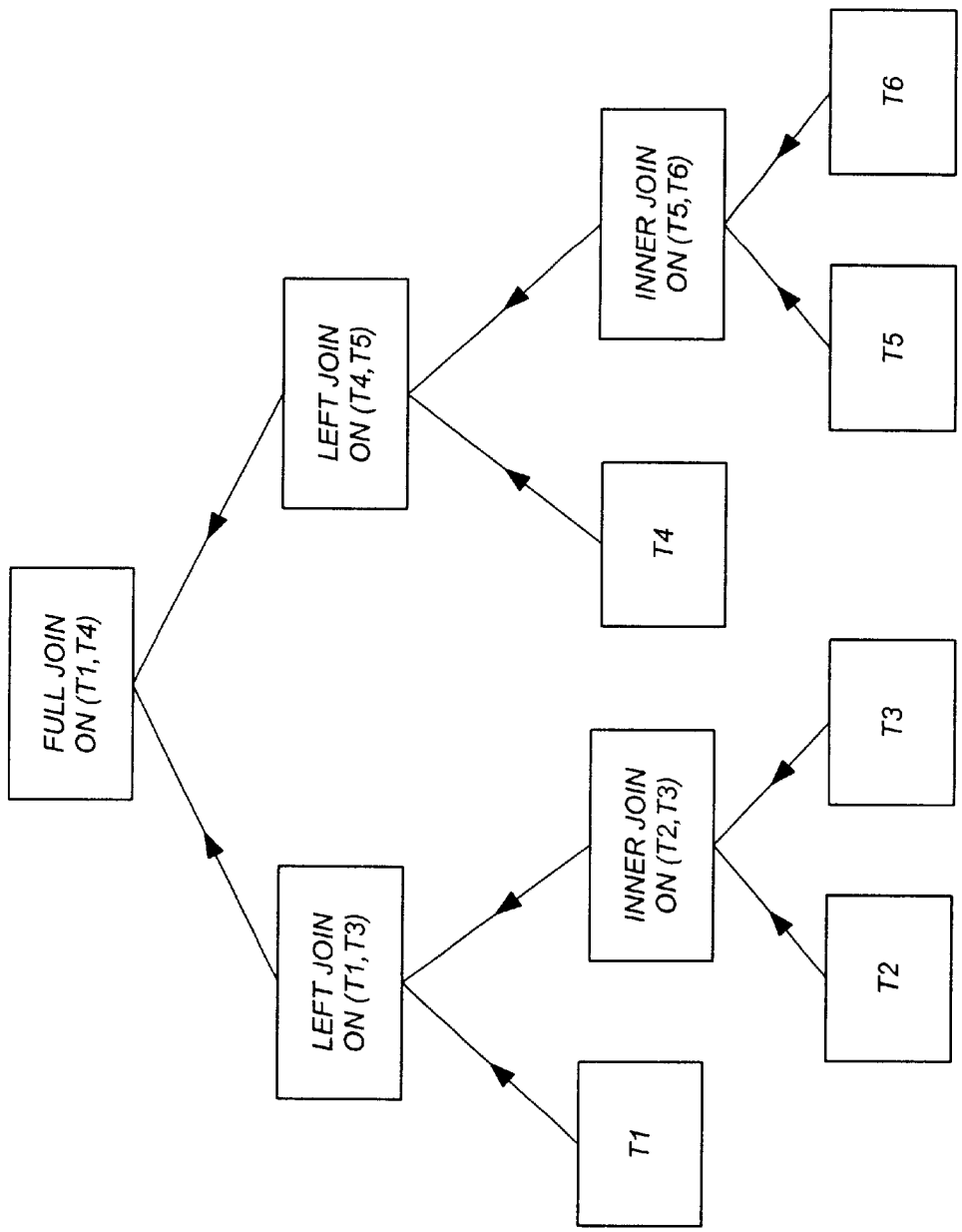

Another example is shown in FIG. 7. If the join enumerator 112 does not permutate the join sequence for the inner join under the null supplying side of an immediate parent join or ancestor join, then the access path selection router 110 will only send a joined table subexpression to the join enumerator 112. In this case, the access path selection router 110 may send INNER-JOIN(T2,T3) as one task to the join enumerator 112, INNER-JOIN(T5, T6) as another task, and the rest of the joined table expressions as another task to the join enumerator 112.

LOGIC OF THE OPTIMIZATION TECHNIQUE

Figure 8:
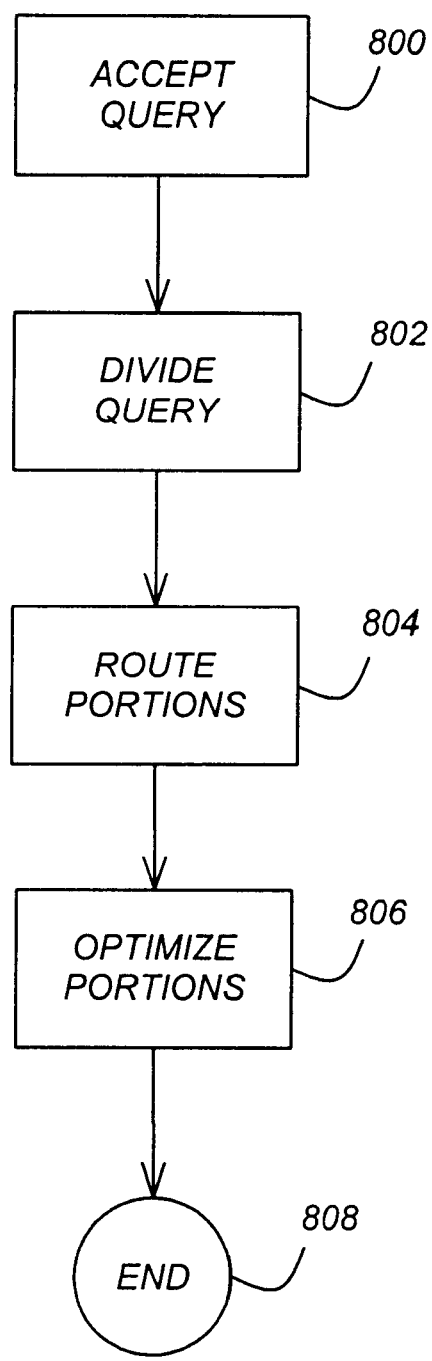
FIG. 8 is a flowchart illustrating the logic of the preferred embodiment of the present invention.

FIG. 8 is a flowchart illustrating the method of optimizing SQL queries in step 204 of FIG. 2 and step 314 of FIG. 3 according to the preferred embodiment of the present invention. Note that the term "query" as referred to herein is intended to cover any access to data, including updates, deletes, and inserts, as well as the simple retrieval of data.

Block 800 represents the optimizer 108 of the RDBMS 104 accepting a query.

Block 802 represents the access path selection router 110 dividing the query into separate portions, so that an overall access path selection is divided into smaller access path selections for each of the portions.

Block 804 represents the access path selection router 110 providing each of the separate portions to a join enumerator 112.

Block 806 represents the join enumerator 112 optimizing the access path selection for each of the separate portions individually. In one embodiment, the join enumerator 112 optimizes joined table expressions and join operators within each of the separate portions of the query. Specifically, the join enumerator introduces a partial ordering relationship among the tables to model left/right outer join order preference and a cluster relationship among table references. The join enumerator 112 can be enhanced as more powerful query optimization techniques become available.

Finally, Block 808 terminates the logic.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program, other than an RDBMS 104 or DBMS, using materialized views or summary tables could benefit from the present invention.

In summary, the present invention discloses a method, apparatus, and article of manufacture for analyzing a query and extending an access path selection for the query, in order to optimize joined table expressions and complex join operations in the query. The extension of the access path selection occurs in two phases: (1) an access path selection router analyzes and divides the query into portions, so that the overall access path selection is divided into smaller access path selections for processing by a join enumerator; and (2) the join enumerator is provided to handle joined table expressions and complex join operators, wherein the join enumerator can be continuously enhanced as more powerful query optimization techniques become available.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a relational database management system, comprising:
    (a) dividing the query into separate portions in an access path selection router: and
    (b) providing each of the separate portions to a join enumerator, so that access path selection for each of the separate portions can be optimized individually;
    (c) wherein the access path selection router divides an overall access path selection into smaller access path selections that are processed separately by the join enumerator.

2. A method of optimizing a query in a relational database management system, comprising:
    (a) dividing the query into separate portions in an access path selection router; and
    (b) providing each of the separate portions to a join enumerator, so that access path selection for each of the separate portions can be optimized individually;
    (c) wherein the access path selection router understands what optimization functions can be performed by the join enumerator.

3. A method of optimizing a query in a relational database management system, comprising:
    (a) dividing the query into separate portions in an access path selection router; and
    (b) providing each of the separate portions to a join enumerator, so that access path selection for each of the separate portions can be optimized individually;
    (c) wherein the join enumerator optimizes joined table expressions and join operators within each of the separate portions of the query.

4. A method of optimizing a query in a relational database management system, comprising:
    (a) dividing the query into separate portions in an access path selection router; and
    (b) providing each of the separate portions to a join enumerator, so that access path selection for each of the separate portions can be optimized individually;
    (c) wherein the join enumerator introduces a partial ordering relationship among tables to model left/right outer join order preference.

5. A method of optimizing a query in a relational database management system, comprising:
    (a) dividing the query into separate portions in an access path selection router; and
    (b) providing each of the separate portions to a join enumerator, so that access path selection for each of the separate portions can be optimized individually;
    (c) wherein the join enumerator introduces a cluster relationship among table references.

6. An apparatus for optimizing a query in a relational database management system, comprising:
    (a) an access path selection router for dividing the query into separate portions; and
    (b) a join enumerator for optimizing access path selection in each of the separate portions individually;
    (c) wherein the access path selection router divides an overall access path selection into smaller access path selections that are processed separately by the join enumerator.

7. An apparatus for optimizing a query in a relational database management system, comprising:
    (a) an access path selection router for dividing the query into separate portions; and
    (b) a join enumerator for optimizing access path selection in each of the separate portions individually;
    (c) wherein the access path selection router understands what optimizing functions can be performed by the join enumerator.

8. An apparatus for optimizing a query in a relational database management system, comprising:
    (a) an access path selection router for dividing the query into separate portions; and
    (b) a join enumerator for optimizing access path selection in each of the separate portions individually;
    (c) wherein the join enumerator optimizes joined table expressions and join operators within each of the separate portions of the query.

9. An apparatus for optimizing a query in a relational database management system, comprising:
    (a) an access path selection router for dividing the query into separate portions; and
    (b) a join enumerator for optimizing access path selection each of the separate portions individually;
    (c) wherein the join enumerator introduces a partial ordering relationship among tables to model left/right outer join order preference.

10. An apparatus for optimizing a query in relational database management system, comprising:
    (a) an access path selection router for dividing the query into separate portions, and
    (b) a join enumerator for optimizing access path selection in each of the separate portions individually;
    (c) wherein the join enumerator introduces a cluster relationship among table references.

11. An article of manufacture embodying logic for performing a method of optimizing a query in a relational database management system, the method comprising:
    (a) dividing the query into separate portions in an access path selection router; and
    (b) providing each of the separate portions to a join enumerator, so that access path selection for each of the separate portions can be optimized individually;

(c) wherein the access path selection router divides an overall access path selection into smaller access path selection,s that are processed separately by the join enumerator.

12. An article of manufacture embodying logic for performing a method of optimizing a query in a relational database management system, the method comprising:

(a) dividing the query into separate portions in an access path selection router; and (b) providing each of the separate portions to a join enumerator, so that access path selection for each of the separate portions can be optimized individually;

(c) wherein the access path selection router understands what optimization functions can be performed by the join enumerator.

13. An article of manufacture embodying logic for performing, a method of optimizing a query in a relational database management system, the method comprising:

(a) dividing the query into separate portions in an access path selection router; and (b) providing each of the separate portions to a join enumerator, so that access path selection for each of the separate portions can be optimized individually;

(c) wherein the join enumerator optimizes joined table expressions and join operators within each of the separate portions of the query.

14. An article of manufacture embodying logic for performing, a method of optimizing a query in a relational database management system, the method comprising:

(a) dividing the query into separate portions in an access path selection router; and (b) providing each of the separate portions to a join enumerator, so that access path selection for each of the separate portions can be optimized individually;

(c) wherein the join enumerator introduces a partial ordering relationship among; tables to model left/right outer join order preference.

15. An article of manufacture embodying logic for performing a method of optimizing a query in a relational database management system, the method comprising:

(a) dividing the query into separate portions in an access path selection router; and (b) providing each of the separate portions to a join enumerator, so that access path selection for each of the separate portions can be optimized individually;

(c) wherein the join enumerator introduces a cluster relationship among table references.

* * * * *

UNITED STATES PATENT AND TRADEMARK OFFICE
CERTIFICATE OF CORRECTION

PATENT NO.    : 6,421,663 B1
DATED         : July 16, 2002
INVENTOR(S)   : Yao-Ching Stephen Chen et al.

It is certified that error appears in the above-identified patent and that said Letters Patent is hereby corrected as shown below:

<u>Column 9,</u>
Line 3, "selection,s" should read -- selections --

Signed and Sealed this

Eighth Day of April, 2003

JAMES E. ROGAN
*Director of the United States Patent and Trademark Office*